(12) United States Patent
Liu et al.

(10) Patent No.: US 8,340,151 B2
(45) Date of Patent: Dec. 25, 2012

(54) V-SHAPED RESONATORS FOR ADDITION OF BROAD-AREA LASER DIODE ARRAYS

(75) Inventors: Bo Liu, Oak Ridge, TN (US); Yun Liu, Oak Ridge, TN (US); Yehuda Y. Braiman, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 12/966,423

(22) Filed: Dec. 13, 2010

(65) Prior Publication Data

US 2012/0147471 A1 Jun. 14, 2012

(51) Int. Cl.
*H01S 3/08* (2006.01)
(52) U.S. Cl. ............ 372/98; 372/99; 372/100
(58) Field of Classification Search ......... 372/92–94, 372/97–103
See application file for complete search history.

(56) References Cited

U.S. PATENT DOCUMENTS

| | | | |
|---|---|---|---|
| 5,231,643 | A | 7/1993 | Naya et al. |
| 6,392,977 | B2 * | 5/2002 | Ando et al. ............ 369/112.01 |
| 6,735,234 | B1 | 5/2004 | Paschotta et al. |
| 7,187,703 | B2 | 3/2007 | Kadoya |
| 7,408,152 | B2 | 8/2008 | Holle et al. |
| 7,609,744 | B2 * | 10/2009 | Raab ............................ 372/96 |
| 7,929,585 | B2 | 4/2011 | Tilleman |
| 2003/0103534 | A1 * | 6/2003 | Braiman et al. ................. 372/10 |
| 2005/0036531 | A1 | 2/2005 | Kan et al. |
| 2009/0316737 | A1 | 12/2009 | Kasamatsu et al. |

OTHER PUBLICATIONS

Liu et al., Coherent addition of high power laser diode array with a V-shape external Talbot cavity, Dec. 3, 2008, vol. 16, No. 25, Optics Express 20935.
Hartke et al., Experimental study of the output dynamics of intracavity frequency doubled optically pumped semiconductor disk lasers, Mar. 11, 2008, Applied Physics Letters 92, 101107.
Raab et al., Direct Generation of 50 ps-Pulses from an External Cavity Diode Laser Yielding 200 mW Average Output Power, Aug. 2005, pp. 841-842, Lasers and Electro-Optics, 2005. CLEO/Pacific Rim 2005.
Saas, et al., Optically pumped surface-emitting semiconductor disk lasers with high spatial and spectral homogeneity, May 2006, pp. 1-2, Lasers and Electro-Optics, 2006 and 2006 Quantum Electronics and Laser Science.

* cited by examiner

*Primary Examiner* — Jessica Stultz
*Assistant Examiner* — Phillip Nguyen
(74) *Attorney, Agent, or Firm* — Novak Druce + Quigg LLP (57) ABSTRACT

A system and method for addition of broad-area semiconductor laser diode arrays are described. The system can include an array of laser diodes, a V-shaped external cavity, and grating systems to provide feedback for phase-locking of the laser diode array. A V-shaped mirror used to couple the laser diode emissions along two optical paths can be a V-shaped prism mirror, a V-shaped stepped mirror or include multiple V-shaped micro-mirrors. The V-shaped external cavity can be a ring cavity. The system can include an external injection laser to further improve coherence and phase-locking.

16 Claims, 10 Drawing Sheets

V-SHAPED RESONATORS FOR ADDITION OF BROAD-AREA LASER DIODE ARRAYS

STATEMENT REGARDING FEDERALLY SPONSORED RESEARCH

This invention was made with government support under Contract No. DE-AC05-00OR22725 awarded by the U.S. Department of Energy. The government has certain rights in this invention.

FIELD OF THE INVENTION

This invention is drawn to systems and methods for coherent addition of broad-area laser diode array.

BACKGROUND OF THE INVENTION

There is much research focused in the area of low cost, high power lasers. Some of this research focuses on combining broad-area semiconductor laser diodes to produce a high-power laser. This research includes Liu et al., "Coherent addition of high power laser diode array with a V-shape external Talbot cavity," which was published in Optics Express, Vol. 16 No. 25 Dec. 8, 2008, pp. 20935-20942 and discloses a V-shape external Talbot cavity for high power broad-area laser diode array coherent beam combining. This arrangement produces a coherent laser; however, center lobe energy of the laser produced by Liu et al. could be improved. Furthermore, the 80% far-field profile visibility indicates the coherence of laser system disclosed by Liu can be improved.

SUMMARY OF THE INVENTION

A system for coherent addition of broad-area laser diode emissions is described. In one example, the system can include an array of broad-area laser diodes, wherein each broad-area laser diode emits radiation and adjacent broad-area laser diodes are separated by a distance ($d_{pitch}$), and a V-shaped cavity. The V-shaped cavity can include a V-shaped reflector arranged to split radiation emitted from each of the broad-area laser diodes into a first beam traveling along a first optical path and a second beam traveling along a second optical path; a fast-axis correction lens disposed between the array of broad-area laser diodes and the V-shaped reflector; a cylindrical lens, having a focal distance (f); and a grating arranged sequentially along the first optical path. The array of broad-area laser diodes can be a two-dimensional array, i.e., at least two rows and at least two columns of broad-area laser diodes.

The grating can be arranged to direct first-order diffraction at the wavelength (λ) toward the array of broad-area laser diodes. A distance along the first optical path between the cylindrical lens and the grating can be substantially equal to a sum of the focal distance (f) and a half-Talbot distance ($Z_t/2$), wherein $Z_t=2d_{pitch}^2/\lambda$. The tolerance of distance variation is about 10% of Talbot distance. The V-shaped cavity can be a ring cavity and the first and second optical paths can overlap in whole or in part.

The V-shaped reflector can be selected from the group consisting of a stepped reflector and an array of micro-prism reflectors. The system can also include a stepped, phase compensation plate arranged along the first optical path positioned between the V-shaped reflector and the cylindrical lens.

The broad-area laser diodes operate in multiple-transverse modes. A laser beam emitted from the system can be coherent at a wavelength (λ).

The system can also include a second cylindrical lens, having a second focal distance ($f_2$), and a second grating arranged sequentially along the second optical path. The second grating can be arranged to direct first-order diffraction at the wavelength (λ) toward the array of broad-area laser diodes and a distance along the second optical path between the second cylindrical lens and the second grating can be equal to the second focal distance ($f_2$).

The system can include an optical coupler arranged along the first optical path or the second optical path. The optical coupler can reject a first portion of the first beam, the second beam or both, and can transmit out of the system a laser beam comprising a second portion of the first beam, the second beam or both.

The system can also include an external injection laser arranged to emit a locking laser beam along the second optical path into the array of broad-area laser diodes. A wavelength of the locking laser beam can be the wavelength (λ) of the laser beam emitted from the system.

In another example, the system for coherent combination of laser diode emissions can include an array of broad-area laser diodes, wherein each broad-area laser diode emits radiation and adjacent broad-area laser diodes are separated by a distance ($d_{pitch}$); and a V-shaped ring cavity. The V-shaped cavity can include a fast-axis correction lens disposed between the array of broad-area laser diodes and the V-shaped reflector, and a V-shaped reflector arranged to split radiation emitted from each of the broad-area laser diodes into a first beam traveling along a first optical path and a second beam traveling along a second optical path. The first and second optical paths can overlap in whole or in part.

The system can also include a cylindrical lens, having a focal distance (f), and a grating arranged sequentially along the first optical path. The grating can be arranged to direct first-order diffraction at the wavelength (λ) toward the array of broad-area laser diodes. A distance along the first optical path between the cylindrical lens and the grating can be substantially equal to a sum of the focal distance (f) and a half-Talbot distance ($Z_t/2$), wherein $Z_t=2d_{pitch}^2/\lambda$. The tolerance of distance variation is about 10% of Talbot distance.

In another example, the system for coherent addition of laser diode emissions at a wavelength (λ) can include an array of broad-area laser diodes, wherein each laser diode emits radiation and adjacent broad-area laser diodes are separated by a distance ($d_{pitch}$); and a V-shaped cavity. The V-shaped cavity can include (i) a V-shaped reflector arranged to split radiation emitted from each of the broad-area laser diodes into a first beam traveling along a first optical path and a second beam traveling along a second optical path, (ii) a fast-axis correction lens disposed between the array of broad-area laser diodes and the V-shaped reflector, (iii) an external injection laser arranged to emit a locking laser beam along a second optical path into the array of broad-area laser diodes, (iv) at least one optical isolator positioned along the second optical path between the external injection laser and the V-shaped reflector, where the at least one optical isolator prevents electromagnetic radiation emitted by the array of broad-area laser diodes from propagating to the external injection laser, (v) a cylindrical lens, having a focal distance (f), and (vi) a grating arranged sequentially along the first optical path. The grating can be arranged to direct first-order diffraction at the wavelength (λ) toward the array of broad-area laser diodes. A distance along the first optical path between the cylindrical lens and the grating can be substantially equal to a sum of the focal distance (f) and a half-Talbot distance ($Z_t/2$), wherein $Z_t=2d_{pitch}^2/\lambda$. The tolerance of distance variation is about 10% of Talbot distance.

In a final example, a method of combining broad-area laser diode emissions at a wavelength ($\lambda$) is described. The method can include providing an array of broad-area laser diodes, wherein each broad-area laser diode emits radiation and adjacent broad-area laser diodes are separated by a distance ($d_{pitch}$). The radiation emitted from each of the broad-area laser diodes can then be split into a first beam traveling along a first optical path and a second beam traveling along a second optical path. The first optical path can include a stepped, phase compensation plate, a cylindrical lens, having a focal distance (f), and a grating arranged sequentially, and the grating can be arranged to direct first-order diffraction toward the array of broad-area laser diodes. A distance along the first optical path between the cylindrical lens and the grating can be substantially equal to a sum of the focal distance (f) and a half-Talbot distance ($Z_t/2$), wherein $Z_t=2d_{pitch}^2/\lambda$. The tolerance of distance variation is about 10% of Talbot distance. A laser beam that is coherent at the specified wavelength ($\lambda$) can then be emitted.

The splitting can be facilitated by a beam splitter selected from the group consisting of a V-shaped prism reflector, a stepped prism reflector, and an array of micro-prism reflectors. The first and second optical paths overlap in whole or in part to form a ring cavity.

An optical coupler can be arranged along the first optical path or the second optical path. The optical coupler can reflect a portion of the first beam, the second beam or both, and can transmit a laser beam comprising a second portion of the first beam, the second beam or both out of the system. The arrays of broad-area laser diodes used in any of the systems described herein can be two-dimensional arrays, at least two rows and at least two columns of broad-area laser diodes.

BRIEF DESCRIPTION OF THE DRAWINGS

A fuller understanding of the present invention and the features and benefits thereof will be obtained upon review of the following detailed description together with the accompanying drawings, in which.

DETAILED DESCRIPTION OF THE INVENTION

The present invention is directed to systems and methods for improving V-shape external cavity designs. In particular, the examples described herein provide for (i) increased near-field filling factor, (ii) increased coherence through external laser injection and laser circulation within a ring cavity, and (iii) improved laser beam quality for incoherent beam combining (spectral beam combing) using a ring cavity. In general, the approaches described herein enable the production of high quality lasers, whether coherent or incoherent, using low quality broad-area laser diodes.

Figure 1:
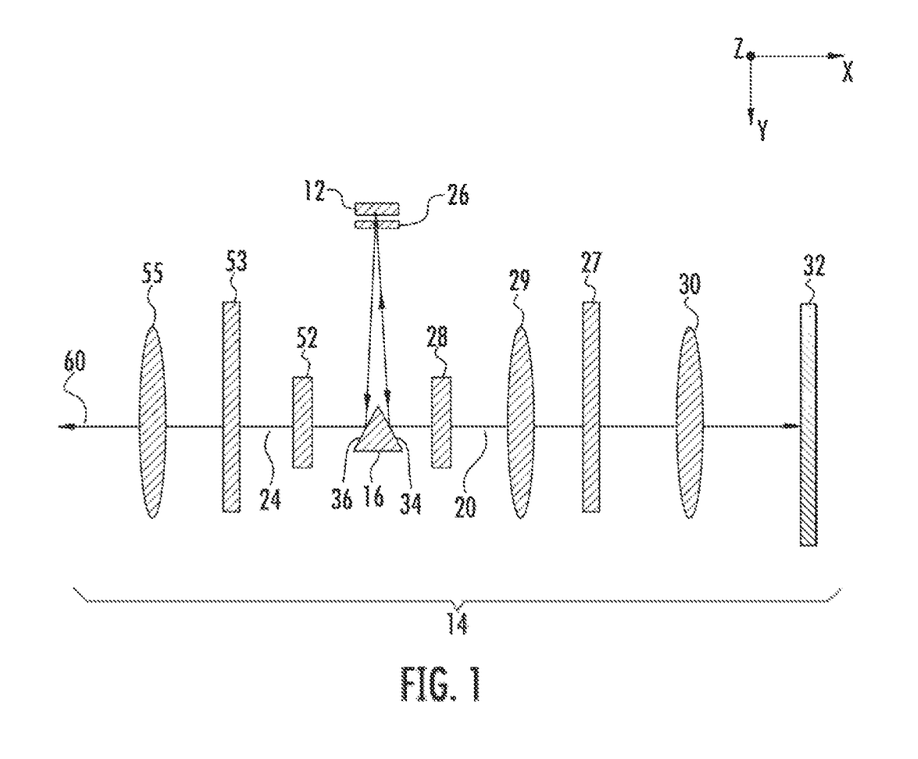
FIG. 1 is a top view schematic of a V-shaped external cavity for coherent beam combining according to the invention.

As shown in the FIG. 1, a system for combination of broad-area laser diode emissions is described. The system 10 can be capable of emitting a laser beam 60 that is coherent at a selected wavelength ($\lambda$). The system 10 can include an array of broad-area laser diodes 12 that emit electromagnetic radiation and an external V-shaped cavity 14. Laser diodes 12 within the array can be separated by a distance ($d_{pitch}$) also referred to as pitch. In any of the systems described herein, the array of broad-area laser diodes can be one dimensional linear array, e.g., 1×50, or multi-dimensional, e.g., at least 2 rows by at least 2 columns. As used herein, the terms "broad-area laser diode" and "laser diode" are used interchangeably to refer to broad-area laser diodes.

The V-shaped cavity 14 can include a V-shaped reflector 16 arranged to split radiation emitted from each of the laser diodes 12 into a first beam traveling along a first optical path 20 and a second beam traveling along a second optical path 24. The V-shaped cavity 14 can also include a fast-axis correction lens 26 disposed between the array of laser diodes 12 and said V-shaped reflector 16. The first and second optical paths 20, 24 can be separate.

As used herein, an "optical path" is the path within the external V-shaped cavity 14 along which electromagnetic radiation travels until the direction of the radiation is reversed along the optical path. For example, in FIG. 7, the optical path 20 continues counter-clockwise around the entire ring cavity and terminates at the optical isolator 80. To the right of the optical isolator 80, is the second optical path 24.

The V-shaped cavity 14 can also include a stepped mirror 16, a phase compensation plate 28, a cylindrical lens 30, having a focal distance (f), and a grating 32 arranged sequentially in that order along the first optical path 20. The grating 32 can be arranged to direct first-order diffraction of the first beam at the desired wavelength ($\lambda$) back toward the array of laser diodes 12.

The distance ($d_{grating}$) along the first optical path 20 between the cylindrical lens 30 and the grating 32 can be substantially equal to a sum of the focal distance (f) and a half-Talbot distance ($Z_t/2$), wherein $Z_t=2d_{pitch}^2/\lambda$ and $d_{pitch}$ is the pitch of the lasers diodes. As used herein, the term "substantially equal" refers to an amount with less than a 50% variation from the stated amount. For example, within 20%, i.e., from 80%*(f+$Z_t/2$) to 120%*(f+$Z_t/2$). However, the invention is not limited in this regard. For example, In some exemplary systems, the distance ($d_{grating}$) along the first optical path 20 between the cylindrical lens 30 and the grating 32 can be within 15% a sum of the focal distance (f) and a half-Talbot distance ($Z_t/2$), within 10% of a sum of the focal distance (f) and a half-Talbot distance ($Z_t/2$) within 5% of a sum of the focal distance (f) and a half-Talbot distance ($Z_t/2$), or within 2.5% of a sum of the focal distance (f) and a half-Talbot distance ($Z_t/2$). These ranges for the distance between the cylindrical lens 30 and the grating 32 are applicable to any of the systems described herein. Further, the various embodiments are not limited to the differences listed above and other specific examples of differences can be used, depending on the configuration of the system.

Figure 5:
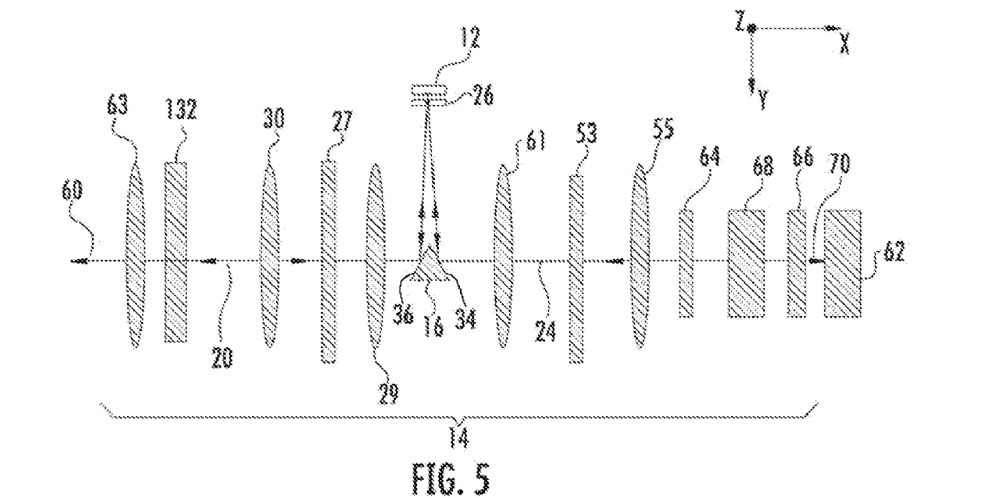
FIG. 5 is a top view schematic of a V-shaped external cavity with external laser injection.
Figure 10:
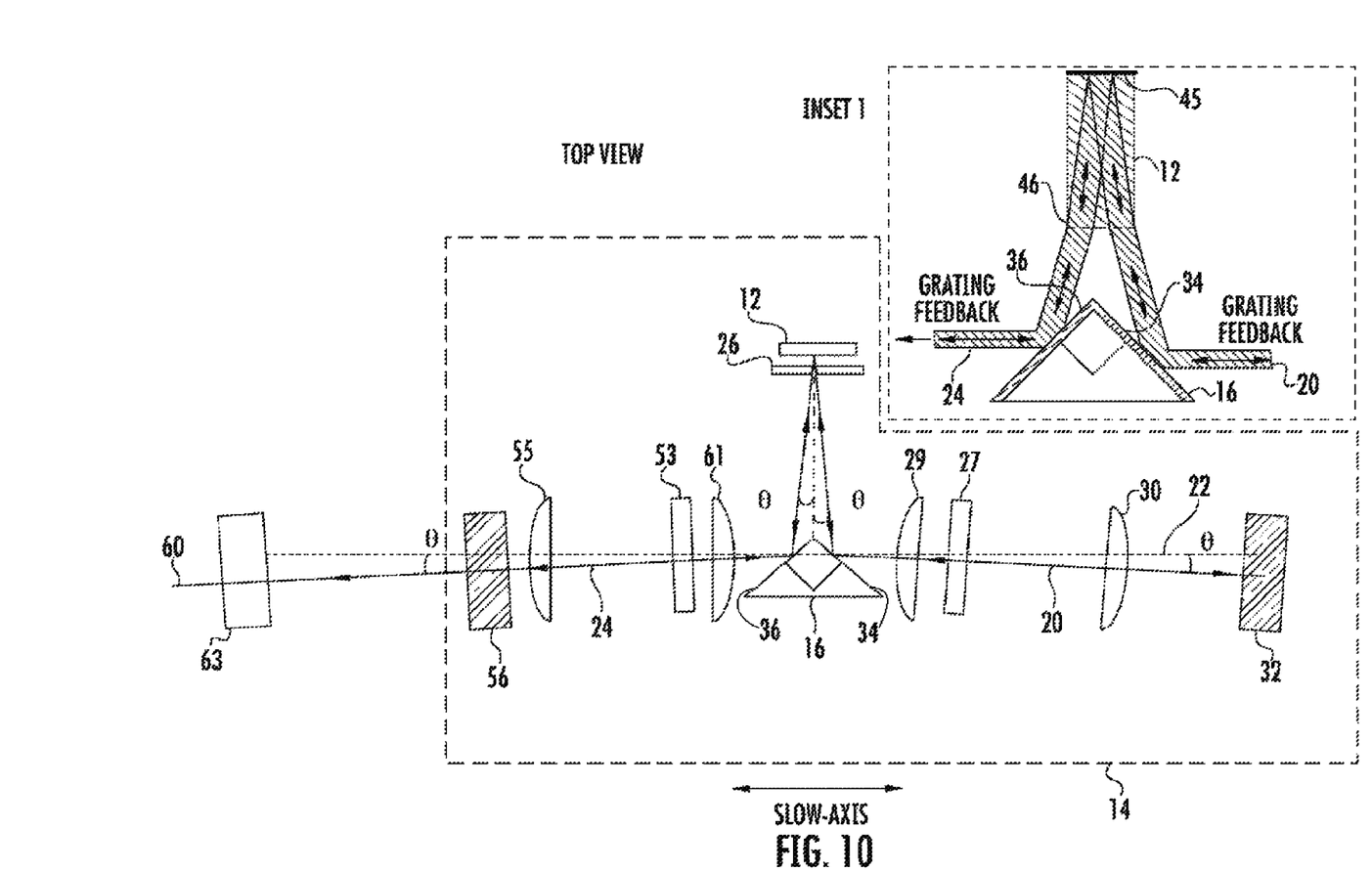
FIG. 10 is a top view of a V-shaped external cavity including two feedback paths according to the invention.

As shown in FIGS. 1, 5, and 10, the first-order diffraction can be directed back toward the first side 34 of the V-shaped reflector 16. In other examples, such as the ring cavity shown in FIG. 7, the first-order diffraction can continue along the first optical path 20 and the second optical path 24 before interacting with the V-shaped reflector 16.

Figure 2:
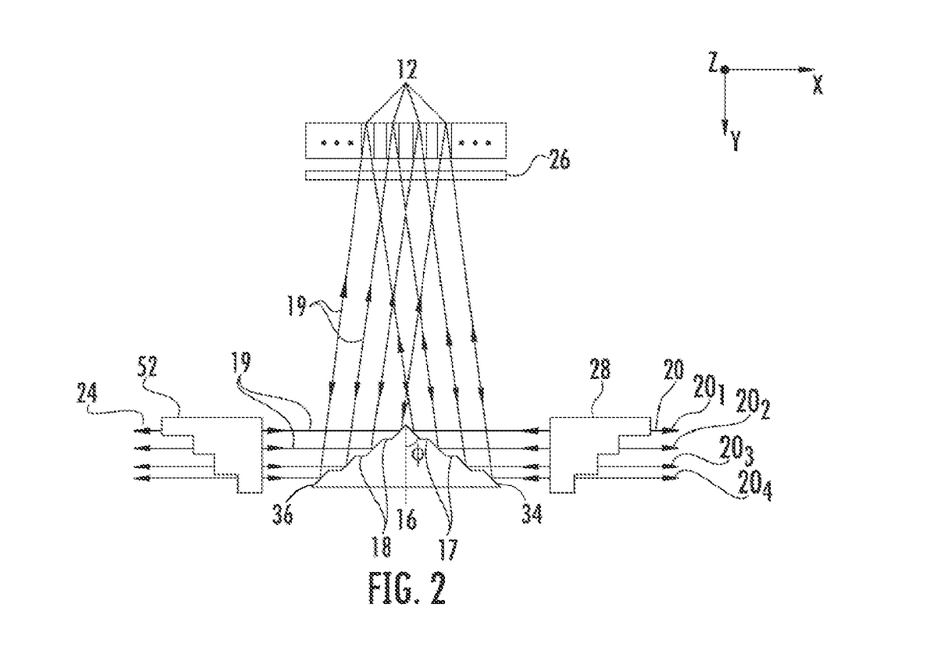
FIG. 2 is a top view schematic of a stepped, V-shaped reflector and two phase compensation plates.
Figure 3:
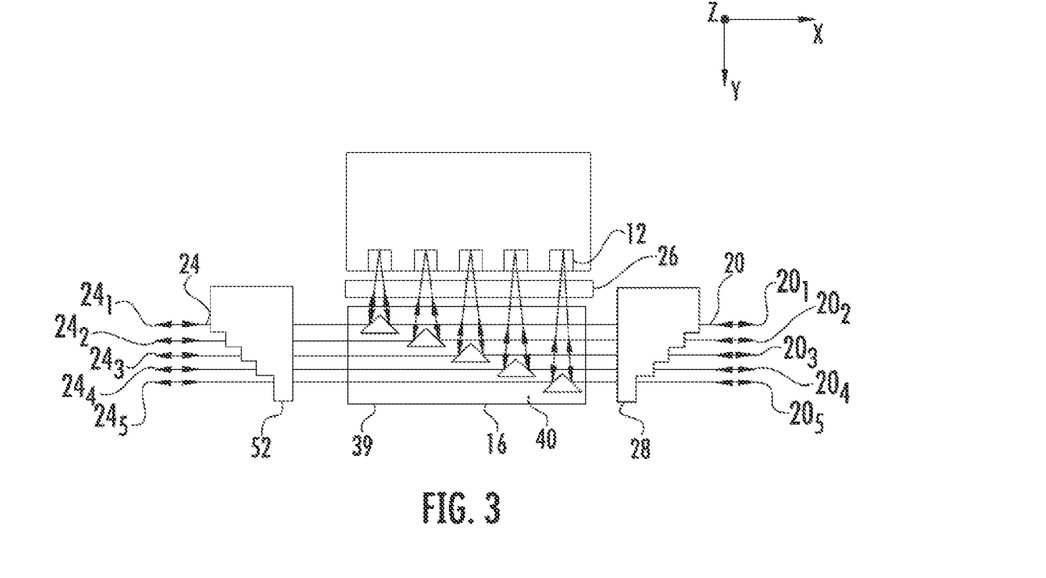
FIG. 3 is a top view schematic of a micro-prism reflector array and two phase compensation plates.
Figure 7:
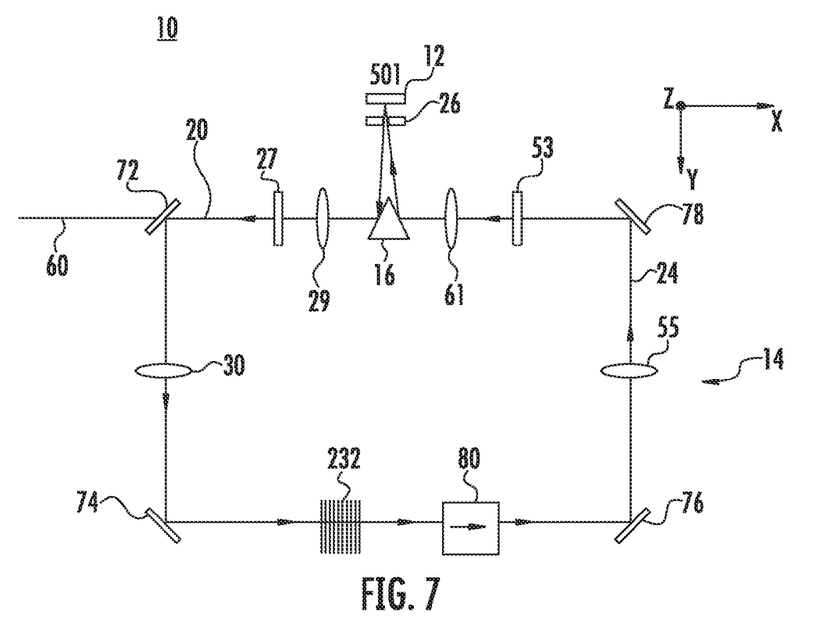
FIG. 7 is a top view of a V-shaped external ring cavity according to the invention.

The V-shaped reflector 16 can be any reflector for splitting an impinging beam into two beams. Exemplary V-shaped reflectors (e.g., mirrors) 16 include continuous V-shaped reflectors as shown in FIGS. 1, 5 & 7, stepped V-shaped reflectors as shown in FIG. 2, and arrays of V-shaped micro-prism reflectors 38 as shown in FIG. 3. The V-shaped reflectors 16 can be coupled to a manipulator 40 for adjusting the position of the V-shaped reflector 16 and therefore, the first and second optical paths 20, 24. The adjustments to position of the V-shaped reflector 16 can be at least one of movement along the x-axis, the y-axis and the z-axis, and can also be rotational.

Where V-shaped micro-prism reflectors 38 are employed, as in FIG. 3, at least one of the V-shaped micro-prism reflectors 38 can be coupled to a manipulator 40 for adjusting a position of the V-shaped micro-prism reflectors 38. The manipulator 40 can adjust the position of the V-shaped-prism reflectors independently or synchronously.

Figure 4:
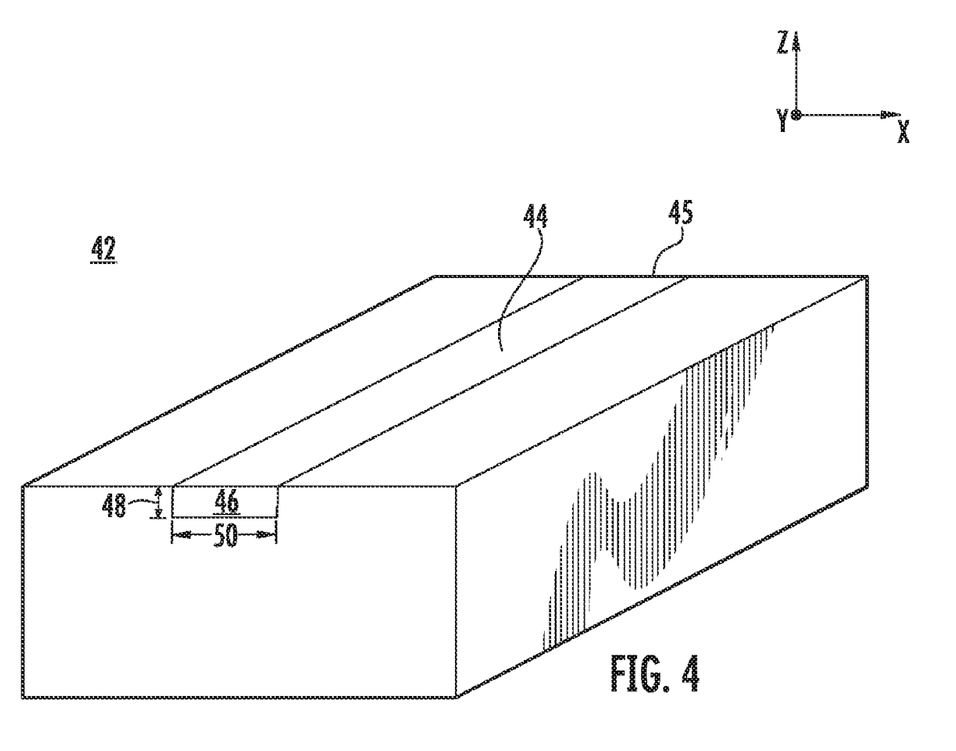
FIG. 4 is a perspective view schematic of a broad-area laser diode.

As shown in FIG. 4, the laser diode 12 can be abroad-urea laser diode 42, also known as a broad stripe or broad emitter laser diode, Broad-area laser diodes 42 are edge-emitting laser diodes that generally include a stripe-shaped p-n semiconductor junction 44 with a front facet 46 of the stripe being an emitting region. The front facet 46 can include an anti-reflective coating to reduce reflection of the front facet 46. The rear facet 45, which is located opposite the front facet 46, can include a high reflectivity surface for reflecting electromagnetic radiation within the p-n semiconductor junction 44.

An exemplary array of laser diodes 12 includes laser diode arrays sold by Jenoptics. A single row of laser diodes can include 47 emitters with 100 µm emitter size and 200 µm spacing. The front facet 46 of laser diodes can be an anti-reflection (AR) coating with 0.5% residual reflectivity and the rear facet 45 can be coated with a high-reflectivity (HR) coating. The center wavelength can be locked at around 808 nm by the grating.

The laser diodes 12 described herein can have a front facet 46 with a height 48 and a width 50. The smaller of the two dimensions is referred to as the "fast axis," while the longer of the two dimensions is referred to as the "stow axis." The laser diodes 12 are operated in multiple-transverse modes and multiple-longitudinal modes. As shown in FIG. 4, the fast axis can be the z-axis and the slow axis can be the x-axis.

The system 10 can also include a second stepped, phase compensation plate 52 arranged along the second optical path 24. In some examples, such as that shown in FIG. 10, the system 10 can include a stepped, phase compensation plate 52 (not shown), a cylindrical lens 55, and a grating 56 arranged sequentially along the second optical path 24.

Figure 6:
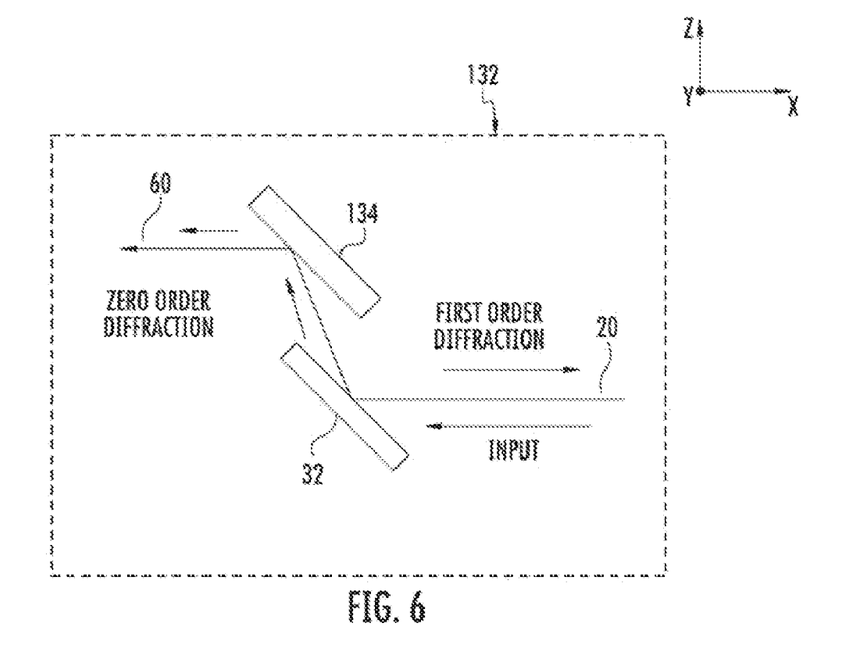
FIG. 6 is a side view of a grating set used in the V-shaped external cavity of FIG. 5.

As shown in FIG. 6, one grating 32 can be arranged in a Littrow configuration. The grating 32 can be utilized as an optical coupler to couple the laser beam 60 out of the cavity 14. The blaze angle of the grating 32 can be about 40° and the first-order diffraction efficiency can be more than 20%. The locked center wavelength of the laser diodes 12 is determined by the grating tilting angle with respect to the front facet 46 of the laser diodes 12. Thus, the tilting angle can be adjusted to adjust the locked center wavelength ($\lambda$) of the laser beam 60.

As shown in FIG. 7, the system 10 can also include an optical coupler 72 arranged along the first optical path 20. The optical coupler 72 can reflect a first portion of a first beam, and also transmit out of the cavity 14 a laser beam 60 comprising a second portion of the first beam. Similarly. FIG. 10 shows a grating 56 that acts as an optical coupler.

As used herein, an "optical coupler" has its normal meaning within laser optics and includes devices that can distribute, e.g., split, electromagnetic radiation among two or more paths. As shown in FIG. 6, an exemplary optical coupler 132 can include a grating and an output reflector.

The power of the laser beam 60 can vary in the various embodiments. For example the power can be at least 0.5 W, 1 W, 5 W, 9.0 W, or 12.5 W. However, the invention is not limited in this regard and other power levels can be used, depending on the configuration of the system. The laser beam 60 can be a coherent laser beam. As shown in FIG. 5, the system 10 can also include an external injection laser 62 arranged to emit a locking laser beam along the second optical path 24 into the array of laser diodes 12. The locking laser 62 can emit a coherent laser beam.

Figure 9:
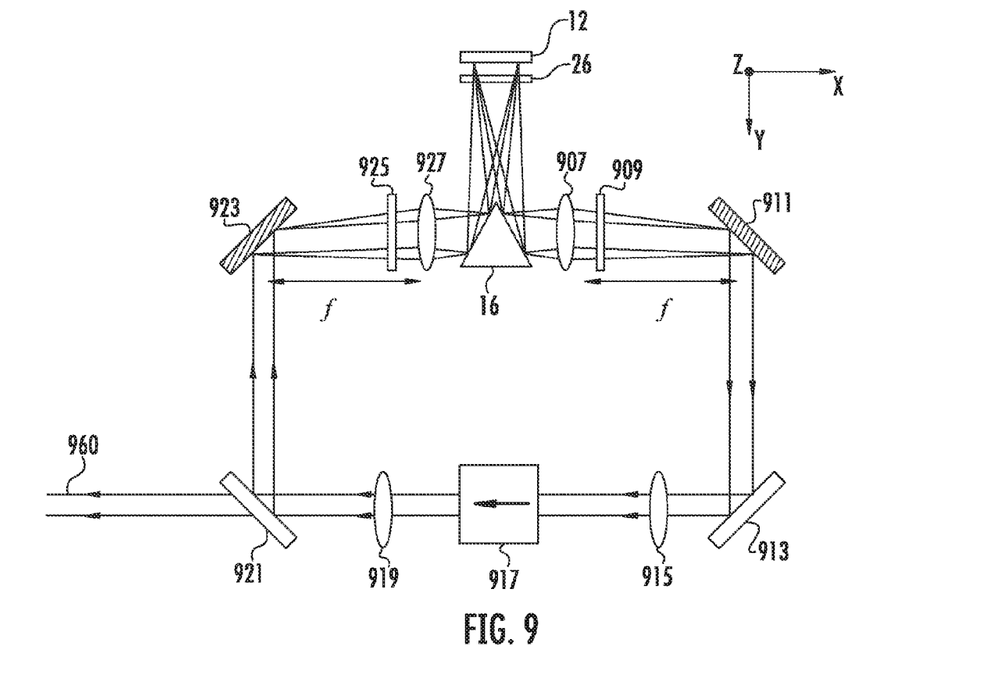
FIG. 9 is a top view of a V-shaped external ring cavity for spectral combining according to the invention.

In some systems, such as those shown in FIGS. 7 & 9, the V-shaped cavity 14 can be a ring cavity and the first and second optical paths can overlap in part (or in whole).

The systems described herein can be particularly useful for producing high power laser beams with large near-field filling factors. As used herein, the near field filling factor=$d_{beam}/2D$, where $d_{beam}$=width of laser beam and D=width of a rear facet of the laser diode. In some embodiments, the near-field filling factor can be at least 50%. However, the invention is not limited in this regard and high or lower near-field tilling factors can be used, depending on the configuration of the system.

As shown in FIG. 7, the invention is also drawn to a system 10 for addition of laser diode 12 emissions that includes an array of laser diodes 12 and a V-shaped ring cavity 14. Each of the broad-area laser diodes 12 can emit electromagnetic radiation and adjacent laser diodes 12 can be separated by a distance ($d_{pitch}$). A laser beam emitted from the system can be coherent at a wavelength ($\lambda$). The V-shaped cavity 14 can include a V-shaped reflector 16 arranged to split radiation emitted from each laser diodes into a first beam traveling along a first optical path 20 and a second beam traveling along a second optical path 24. The V-shaped cavity 14 can be a ring cavity and the first and second optical paths 20, 24 can overlap in whole or in part. The V-shaped cavity 14 can also include a fast-axis correction lens 26 disposed between the array of laser diodes 12 and the V-shaped reflector 16.

The ring cavity can also be used to produce a coherent laser beam or an incoherent laser beam as shown in FIG. 9. The ring cavity systems can include any of the features included in the other systems described herein.

The invention is also drawn to a method of producing a coherent laser beam. The method can include providing an array of laser diodes as described herein and splitting radiation emitted from each of the laser diodes into a first beam traveling along a first optical path and a second beam traveling along a second optical path. The first optical path can include a stepped, phase compensation plate, a cylindrical lens, having a focal distance (f), and a grating arranged sequentially. The grating can be arranged to direct first-order diffraction toward said array of laser diodes. A distance along the first optical path between the cylindrical lens and the grating can be substantially equal to a sum of the focal distance (f) and a half-Talbot distance ($Z_t/2$). The tolerance of distance variation is about 10% of Talbot distance.

The splitting can be facilitated by a beam splitter selected from the group consisting of a V-shaped prism reflector, a stepped prism reflector, and an array of micro-prism reflectors. The first and second optical paths can overlap in whole or in part to form a ring cavity.

The method can include providing any of the elements that are part of the systems described herein and can include performing any of the steps that are performed by any of the elements that are part of the systems described herein. For example, where an optical coupler is used, the method can include distributing or splitting electromagnetic radiation among two or more paths.

FIG. 1 is a top view of a system with a V-shaped external cavity 14. The laser diode array 12 emits electromagnetic radiation that passes through fast-axis correction lens 26 and V-shaped reflector 16 splits the beam so that it travels along first and second optical paths 20, 24. The reflected beam traveling along the first optical path 20 passes through a phase compensation plate 28 and cylindrical lens 30 before reaching diffraction grating 32. A con-focal cylindrical lens pair (30 and 29) images the array of laser diodes 12 along the slow axis. The fast-axis correction lens 26 and first collimating lens 27 can be a collimating lens pair. The diffraction grating 32 provides the diffraction coupling feedback back along the first optical path 20 to the array of laser diodes 12.

As used herein, "cylindrical lens" is used to refer to cylindrical shaped lens, which focus input tight in one dimension. However, the specific function of the cylindrical lens is generally provided in the description. Cylindrical lens can be used to focus slow-axis laser diode images or collimate the fast-axis of the beams.

Cylindrical lenses function in one-dimension. For example, in FIG. 1, cylindrical lens pairs 26, 27 and 26, 53 collimate the laser beam in the Z-direction; while cylindrical lenses 29, 30 collimate the laser beam in the Y-direction. Cylindrical tens 55 is the Fourier transformation lens, which projects the laser beam into region.

The second optical path 24 can include a phase compensation plate 52, a second collimating lens 53 and a second cylindrical lens 55. A coherent laser beam 60 can be transmitted from the second cylindrical lens 55. The wavelength of the coherent laser beam 60 can be controlled based on the coupling feedback provided by the diffraction grating 32.

FIGS. 2 & 3 depict examples where the near-field filling factor can be increased. FIG. 2 shows a prism step mirror as the V-shaped reflector 16. Each half 34, 36 of the V-shaped reflector 16 includes a plurality of distinct angled surfaces 17. Each of the distinct angled surfaces 17 can be planar and arranged at the same angle (φ) from the y-axis. The distinct angled surfaces 17 can be separated by an intermediate surface 18 arranged at angles from the y-axis different from the distinct angled surfaces 17.

As shown in FIG. 2, the prism step mirror 16 can separate the beams 19 emitted from the individual broad-area laser diodes 12 and rearrange the positions of the beams 19 resulting in an increase in the near-field filling factor. The phase compensation plates 28 & 52 are designed to compensate for the optical path shift of each individual laser beam generated by step-mirror 16. As will be understood, the thickness of each phase compensation plate 28 & 52 is designed so that the optical paths of all beams are identical before the phase compensation plate and after the phase compensation plate.

FIG. 3 shows an example where V-shaped reflector 16 includes an array of micro-prism reflectors 39 is used in order to increase the near-field filling factor. This embodiment can also be used to reduce the distance between the array of laser diodes 12 and the V-shaped reflector 16. This is because in systems 10 using continuous V-shaped reflectors 16 or stepped, V-shaped reflectors 16, the V-shaped reflector must be sufficiently far from the laser diode array 12 that the spread of the beam emitted by each of the broad-area laser diodes, i.e., along the slow-axis, causes a portion of each beam to interact with the first side reflector 34 and another portion of the beam to interact with the second side reflector 36. Thus, depending on the design parameters of interest, the ratio of individual micro-prism reflectors 39 to laser diodes 12 can range from 1:1 to 1:50. As will be understood, the distance between the array of laser diodes 12 and the V-shaped reflector 16 can be decreased as the ratio of micro-prism reflectors 38 to laser diodes 12 approaches 1:1.

In FIG. 3, the V-shaped reflector 16 includes a micro-prism mirror array (MPMA) 39 that separates, bends and re-shapes the impinging electromagnetic radiation. After the laser beam interacts with the MPMA 39, the near-field filling factor of array of laser diodes 12 is increased. Because the MPMA 39 shifts each individual laser beam, phase compensation plates 28 and 52 are included to ensure that each parallel laser beam travels an equal optical distance from the start of one phase compensation plate 28, 52 through the respective laser diode 12 and through the terminus of the other compensation plate 52, 28. The size of system 10 in this configuration can be significantly reduced compared with continuous V-shaped reflectors 16 or stepped, V-shaped reflectors 16 because MPMA 39 can be located close to array of laser diodes 12.

As shown in FIGS. 2 & 3, the near field filling factor is increased by directing the beams from each laser diode 12 along a plurality of parallel optical paths $20_{1...n}, 24_{1...n}$. The parallel optical paths $20_{1...n}, 24_{1...n}$ are distinct. In particular, where prism step mirrors 16 or MPMAs 39 are used, a plurality of parallel optical paths can be produced. The parallel optical paths can be distinct or partially overlap.

The phase compensation plates 28 and 52 serve to ensure that the optical distance for each of the parallel optical paths are the same from the start of one phase compensation plate 28 to the exit of the other phase compensation plate 52 with the respective diodes 12 as an intermediate point. For each optical path, the difference in optical difference between the nearest-neighbor laser beams (i.e., $20_{1...n}$ to $24_{1...n}$) is $\Delta d_{path}$. The purpose of phase compensation plate 28, 52 is to compensate for the optical path difference $\Delta d_{path}$ between the nearest-neighbor laser beams. The thickness difference of the nearest-neighbor steps in one phase compensation plate (28 or 52) is $$\Delta d_{thickness} = \frac{\Delta d_{path}}{2(n_{phase} - n_{air})},$$

where the refractive index of the phase compensation plate is $n_{phase}$ and the refractive index of air is $n_{air}$. This assumes the phase compensation plate 28 and 52 are identical; however, it will be understood that the phase compensation plates can be different so long as the optical distance of each optical path from the start of one phase compensation plate 28 to the exit of the other phase compensation plate 52 is the same. In this way, the phase compensation plates 28 & 52 compensate the optical path difference generated by micro-prism mirror and V-shape path between the nearest-neighbor beams when the beams go through the two phase compensation plates 28, 52.

As shown in FIGS. 5 & 6, an external injection laser 62 can be used in order to increase the coherence of the laser beam 60 produced by the system 10. This system 10 includes an array of laser diodes 12, a fast-axis correction lens 26, a V-shaped reflector 16, several cylindrical lenses 53, 55, 61, 29, 27, 30 and a grating set 132, much like the embodiment of FIG. 1. In addition, the system 10 of FIG. 5 also includes cylindrical lenses 61, 63, optical isolators 64, 66, tapered amplifier 68 and the external injection laser 62.

The narrow line-width laser beam 70 emitted by the external cavity laser 62, which is coherent, is amplified by a tapered amplifier 68. The optical isolators 64, 66 are used to guarantee that on the external cavity laser 62 side of the optical isolators 64, 66 the narrow tin-width laser beam 70 propagates in only one direction, i.e., toward the V-shaped reflector 16. The amplified laser beam exiting the second optical isolator 64 is injected into the array of laser diodes 12 to provide additional phase locking and improve coherence of the laser beam 60 emitted from the system 10.

Cylindrical lens pairs 61, 55 and 29, 30 are used to image the laser diodes 12 along, the slow-axis. The electromagnetic radiation emitted by the laser diodes 12 is collimated along the fast axis (Z-axis) by collimating lens pairs 26, 27 and 26, 53 for the first and second optical paths 20, 24, respectively. Finally, cylindrical lens 63 is a cylindrical lens for transmitting the coherent laser beam 60 out of the system 10.

The detailed configuration of grating mirror set 132 is shown in FIG. 6. The diffraction grating 32 can be mounted in a Littrow configuration as shown. The diffraction grating 32 can be arranged to reflect the first-order diffraction back toward the array of laser diodes 12 and couple the zero-order diffraction to the output reflector 134, which reflects the coherent laser beam 60 out of the system 10. Diffraction grating 132 can be positioned a half Talbot distance from the focal plane of cylindrical lens 30. As explained above, this enables the diffraction grating set 132 to provide diffraction coupling feedback to the array of laser diodes 12.

As will be understood, additional features, including those described herein, can be incorporated into the system 10 shown in FIGS. 5 & 6. For example, stepped, phase compensation plates can be included between the V-shaped reflector 16 and cylindrical lenses 61 and 29 to increase the near-field filling factor. In addition, a step mirror or MPMAs can be used as the V-shaped reflector.

Figure 8:
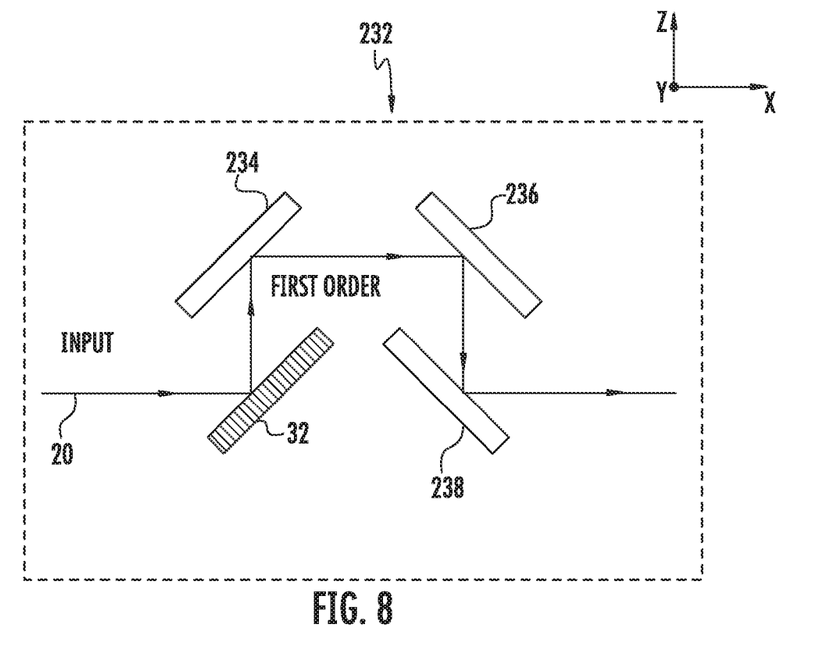
FIG. 8 is a side view of a grating set used in the V-shaped external ring cavity according to FIG. 7.

As shown in FIGS. 7 & 8, the system 10 can include a V-shaped ring cavity 14 in order to increase the coherence of the laser beam 60 emitted from the system 10. The system 10 can include an array of laser diodes 12, a fast-axis correction lens 26, a V-shaped reflector 16, several cylindrical lenses 27, 29, 30, 53, 55 and 61, reflectors 74, 76 & 78, an optical coupler 72, an optical isolator 80, which only allows beams propagation in one direction (i.e., counter-clockwise in FIG. 7), and a grating system 232 for spectral filtering and diffraction coupling purpose. The optical coupler 72 reflects a portion of beam back into ring cavity and couples out the rest portion as beam 60. Although four right-angle reflectors 72, 74, 76 & 78 are used for form the rectangular ring cavity shown, any number of reflectors can be used to form the ring cavity, e.g., 3 reflectors, 5 reflectors, 6 reflectors, 7 reflectors, 8 reflectors, etc.

As shown in FIG. 8, the grating system 232 can be designed so that the first-order diffraction from the grating 32 is coupled to the reflectors 234, 236, 238. In this example, the zero-order diffraction from the grating can be blocked (or used as an output for system monitoring) rather than returned along the first optical path 20. Cylindrical lenses pairs 26, 53 and 26, 27 collimate the laser beam along the fast-axis, i.e., the z-axis. The array of broad-area laser diodes 12 is imaged on grating 32 along the second optical path 24 by con-focal cylindrical lens pair 61, 55 and on the grating 32 along the first optical path 20 be con-focal cylindrical lens pair 29, 30. The position of the grating 32 can be adjusted to a half-Talbot distance past the focal plane of cylindrical lens 30. The first-order diffraction is coupled using the grating set 232 to cause the beam to continue to circulate along the first optical path counter-clockwise in ring cavity. Thus, in FIG. 7, the first optical path 20 extends along the entirety of the ring cavity, while the second optical path 24 terminates at the optical isolator 80.

As will be understood, additional features, including those described herein, can be incorporated into the system 10 shown in FIGS. 7 & 8. For example, stepped, phase compensation plates can be included between the v-shaped reflector 16 and cylindrical lenses 61 and 29 to increase the near-field filling factor. Similarly, the coherent laser beam 60 can pass through a cylindrical lens prior 27 to being emitted from the stem 10.

Spectral beam combining is an important technology for use in incoherent combining of arrays of laser diodes. A grating and optical coupler can provide spatial overlapping of laser diode emissions by forcing laser diode lasing in one direction with different wavelengths. A near diffraction limited laser beam can be achieved by using a single mode laser diode array. In principle, the beam quality of the laser diode array would be limited by the beam quality of the individual laser diodes in the array.

FIG. 9 shows a system that includes a V-shaped ring cavity 14 for spectral beam combining. The system can include an array of laser diodes 12, a fast-axis correction lens 26 and a V-shaped reflector 16 that splits and bends the electromagnetic radiation emitted from the laser diodes 12. Cylindrical lens 907 can focus the electromagnetic radiation traveling clockwise on grating 911, i.e., the distance between grating 911 and cylindrical lens 907 can be the focal length (f) of cylindrical lens 907. Cylindrical lens 927 can focus the electromagnetic radiation traveling counter-clockwise on grating 923, i.e., the distance between grating 923 and cylindrical lens 927 can be the focal length (I) of cylindrical lens 927. Lenses pairs (26, 909) and (26, 925) can collimate the electromagnetic radiation emitted by the laser diodes along the fast-axis direction (Z-axis). Cylindrical lenses 915 and 919 can image the laser diodes 12 along the slow-axis.

The optical isolator 917 prevents counter-clockwise beam propagation past the optical isolator 917. The laser beam traveling within the V-shaped cavity 14 is bent at a right angle by mirror 913. The optical coupler 921 reflects a portion the beam back into the ring cavity and couples the rest of the radiation out as a laser beam 960. This arrangement may improve the quality of a spectral laser beam over previously known V-shape external cavities for spectral beam combining. As will be understood, additional features, including those described herein, can be incorporated into the system 10 shown in FIG. 9.

FIG. 10 shows a system 10 with a closed-loop V-shaped external Talbot cavity 14. The laser diodes 12 can be part of a laser diode array, such as those manufactured by Jenoptics. An exemplary laser diode array can include a 1×47 array with a 100 μm emitter size and 200 μm spacing. The front facet 46 of laser diodes 12 can include an anti-reflection (AR) coating, such as one with 0.5% residual reflectivity. The rear facet 45 can be coated with a high-reflectivity (HR) material. The center wavelength of the laser diodes 12 can be locked around 808 nm.

A V-shaped reflector 16 can be positioned to direct the laser diode emissions along the first and second optical paths 20, 24. The first optical path 20 can include cylindrical lenses 27, 29 & 30 and grating 32 while the second optical path 24 can include cylindrical lenses 53, 55 & 61 and grating 56. The optical axes of the first and second optical paths 20, 24 and the slow-axis 22 of the laser array can form a small angle $\theta=2.38°$. This angle is equal to half of the angle separating the two laser beams emitted from each individual laser diode 12.

Although described with respect to FIG. 10, it will be understood that this off-axis approach can be useful in other systems described herein. The off-axis approach can be used to control the transverse mode of each broad-area laser diode on an array. As a result, the off-axis approach can produce better (spatial) mode discrimination capability and is better suited to achieve a high quality spatial beam quality.

In the feedback path of the first optical path 20, a telescope comprised of a fast-axis correction lens 26 and cylindrical lens 27 collimates the laser diode emission along the fast axis. The "smile" effect due to an imperfect manufacturing process can be reduced eight times by the fast-axis telescope in this external cavity configuration according to ray-tracking calculations. The laser diodes 12 are imaged on the focal plane of cylindrical lens 30 through the transform optics that includes confocal cylindrical lens pair 29 and 30. The laser diode emission traveling along the first optical path 20 is reflected by diffraction grating 32, which is arranged in the Littrow configuration. The blaze angle of the grating 32 can be about W and the first-order diffraction efficiency can be more than 85%. The locked center wavelength of the array of laser diodes 12 is determined by the tilting angle of the grating 32 with respect to the front facet 46 of the laser diode 12.

In the second optical path 24 of FIG. 10, a telescope comprised of the fast-axis correction lens 26 and cylindrical lens 53 collimates the laser diode emission along the fast axis. Another confocal cylindrical lens pair 61 and 55 images the laser diodes 12 onto the surface of the second grating 56 (2000-line/mm, gold-coating), which is also mounted in the Littrow configuration. The second grating 56 reflects the first-order diffraction back toward the laser diodes 12, while coupling the zero-order diffraction out through cylindrical lens 63 as a coherent laser beam 60.

In FIG. 10, the second grating 56 can be arranged to reflect 20% of the incident light back toward the army of laser diodes 12 and couples the rest of the incident light out of the cavity as a coherent laser beam 60. The second grating 56 serves as an optical coupler for the entire array.

The inset of FIG. 10 shows a portion of the V-shaped cavity 14 for an individual broad-area laser diode 12. The impinging radiation emitted from the broad-area laser diode 12 is directed along the first and second optical paths 20, 24 by the V-shaped reflector 16. Although show with a straight reflective surfaces, the V-shaped reflector 16 can be a stepped reflector and an array of micro-prism reflectors (as shown in FIGS. 2 & 3). The effective external V-shaped cavity 14 extends to the first and second gratings 32, 56.

It should be noted that the AR-coated front-facet reflectivity of laser diode is much lower than the reflectivity of the gratings 32, 56. The first grating 32 serves as an end mirror and a spectral selector while the high-reflectivity rear facet 45 serves as a beam folding mirror. The second grating 56 serves as both a spectral selector and an output coupler.

Figure 11:
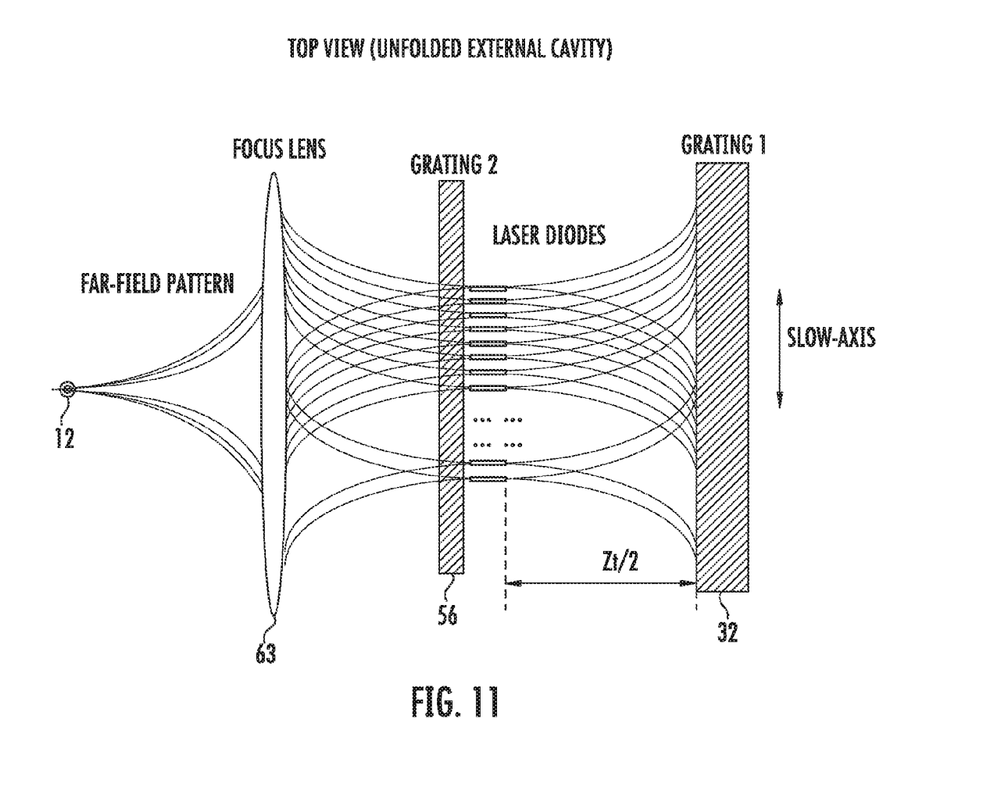
FIG. 11 is a view of the unfolded V-shaped external cavity of FIG. 10 showing the feedback resulting from the two gratings.

The unfolded external cavity for the entire array is shown in FIG. 11. The near-field distributions of laser diode emissions toward the right feedback path or toward the left feedback path are imaged on the focal planes of cylindrical lenses 30 and 55, respectively. The distance between the first grating 32 and the focal plane of cylindrical lens 30 can be substantially equal to the half-Talbot distance $D=Z_t/2$, where $Z_t=2d_{pitch}^2/\lambda$ is the Talbot distance, $\lambda$ is the laser wavelength, and $d_{pitch}$ is the array pitch. The diffractive coupling is achieved due to the Talbot self-image effect. The second grating 56 is located at the focal plane of cylindrical lens 55. The second grating 56 provides non-coupled feedback as well as an output. The effective cavity round-trip is calculated from the formula $L=2(D)=Z_t$. The coupling of off-axis feedback can produce a coherent laser beam 60.

As will be understood, additional features, including those described herein, can be incorporated into the system 10 shown in FIGS. 7 & 8. For example, stepped, phase compensation lenses can be included between the v-shaped reflector 16 and cylindrical lenses 61 and 29 to increase the near-field filling factor. Similarly, the coherent laser beam 60 can pass through a cylindrical lens prior to being emitted from the system 110.

EXAMPLES

In the system, a laser diode array manufactured by Jenoptics that included 47 emitters with a 100 μm emitter size and 200 μm spacing was used. The center wavelength was around 808 nm and the front facet of each laser diode included an antireflective (AR) coating with 0.5% residual reflectivity and each rear facet having a high-reflectivity (HR) coating.

A sample system equivalent to FIG. 10 was produced. In FIG. 10, the lenses 27, 29, 30, 53, 55 & 61 are cylindrical lenses with a 200 mm focal length. The first grating 32 is a 830-line/mm, gold-coated grating, while the second grating 56 is a 2000-line/mm, gold-coated grating. The first and second gratings 32, 56 are both reflective gratings. Fast-axis correction lens has a focal length of 1.3 mm ($f_{FAC}=1.3$ mm) and a numerical aperture of 0.5 (NA=0.5). The V-shaped reflector 16 is a right-angle prism mirror. The optical axis of each feedback path and a line parallel to the slow-axis form a small angle $\theta$. The second grating 56 provides feedback of first-order diffraction and couples a laser beam output through zero-order diffraction. Additional details regarding the exemplary system described herein can be found in B. Liu et al., "Coherent beam combining of high power broad-area laser diode array with a closed-V-shape external" Optics Express, Vol. 18, Issue 7, pp. 7361-7368 (2010), which is incorporated herein by references. The system included an AR coated broad-area laser diode array and two external gratings 32 & 56. The feedback from the two gratings formed a close loop V-shape external cavity. A right-angle prism 16 having an HR coating on its two faces was utilized to split each laser beam from each laser into two beams. The two beams enter two different feedback paths 20, 24. The right-side feedback path 20 includes a fast-axis correction (FAC) lens 26, cylindrical lenses 27, 29 & 30, and a first grating 32. The left-side feedback path 24 included the FAC lens 26, cylindrical lenses 53, 55 & 61, and a second grating 56. The optical axis of each feedback path formed a small angle $\theta=2.38°$ with the slow-axis of the laser array. As shown in FIG. 10, this angle is equal to the half of the angle firmed by two laser beams separated by the prism mirror.

Telescopes were used to collimate the laser beam along the fast axis in each feedback path 20, 24. Lens 27 and fast-axis correction lens (FAC) 26 formed one telescope while lens 53 and FAC 26 formed another telescope. The "smile" effect of the laser diode array was reduced by the fast-axis telescopes according to ray-tracking calculation. In the right-side feedback path 20, a confocal lens pair 29 & 30 image the laser array to the lens 30 focal plane. The laser beam is reflected by the diffraction grating 32, which was arranged in the Littrox configuration.

The blaze angle of diffraction grating 32 was about 18° and the first-order diffraction efficiency was more than 85%. In such a configuration, the locked wavelength of the laser array is determined by the grating tilting angle with respect to the optical table plane. The distance between lenses 30 and grating 32 was $D=f_3+Zt/2$ where $Zt=2d^2/\lambda$ is the Talbot distance, $\lambda$ was laser wavelength, and d is the laser array pitch. The diffraction-coupling is achieved due to the Talbot effect.

In the left-side feedback path, the lens pair 61, 55 images the laser arrays to the focal plane of 55. The second grating 56 is mounted at the focal plane of the second lens 55 in the Littrow configuration. The second grating 56 reflects the first order diffraction beam into the laser array and couples out the zero-order beam. The second grating 56 reflects 20% of the incident light back toward the laser array according to the grating reflection efficiency and serves as an optical coupler of the entire array. The effective cavity round-trip length is designed according to the formula $L=2(D-f_3)=Zt$.

The far-field profile of the laser beam 60 was projected to the focal plane of an additional lens outside the V-shaped cavity and recorded by a CO) camera. An optical spectrum analyzer with a sensitivity of 70 pm was used to measure the spectrum, while the power meter monitors the output power of the array.

The inset of FIG. 10 shows the external cavity of an individual broad-area laser diode 12. The effective external cavity is composed of the two diffraction gratings 32, 56 (considering the AR-coated front-facet reflectivity of laser diode is much lower than gratings' reflectivity). The first grating 32 serves as an end mirror and a spectral selector while the high-reflection coating rear facet 45 serves as a beam folding mirror. The second grating 56 functions as both a spectral selector and an output coupler. Coherent beam combining is achieved by tuning the external cavity round trip to the Talbot distance. The first grating 32 can be shifted from the image plane to the half Talbot distance or the second grating 56 can be shifted from the image plane to the half Talbot distance.

Figure 12A:
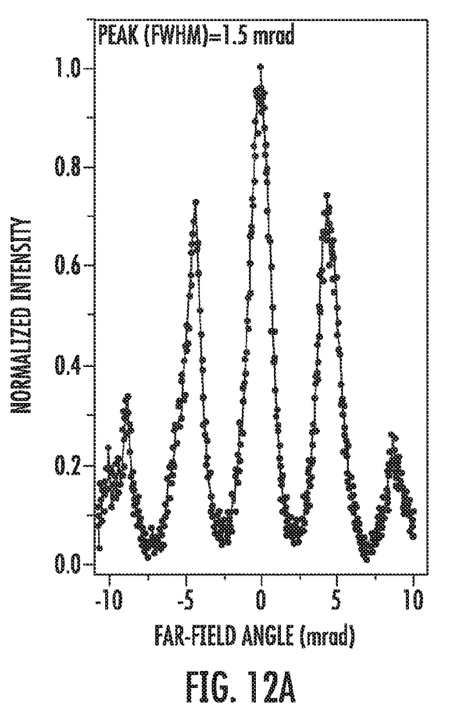
FIGS. 12(a) and (b) show experimental results in the form of (a) a far-field profile and (b) a spectrum of a phase-locked laser array at 60 A with a V-shape external Talbot cavity.

FIG. 12A shows the symmetric far-field profile generated from the phase-locked laser diode array when the first grating 32 is positioned around the half-Talbot plane from the focal plane of cylindrical lens 30 and the second grating 56 is positioned at the focal plane of cylindrical lens 55, i.e., the effective round-trip of the external cavity equals the Talbot distance.

The degree of coherence in the laser system was quantified by calculating the visibility of the far-field profile using the following expression:

$$V=(I\max-I\min)/(I\max+I\min).$$

Figure 12B:
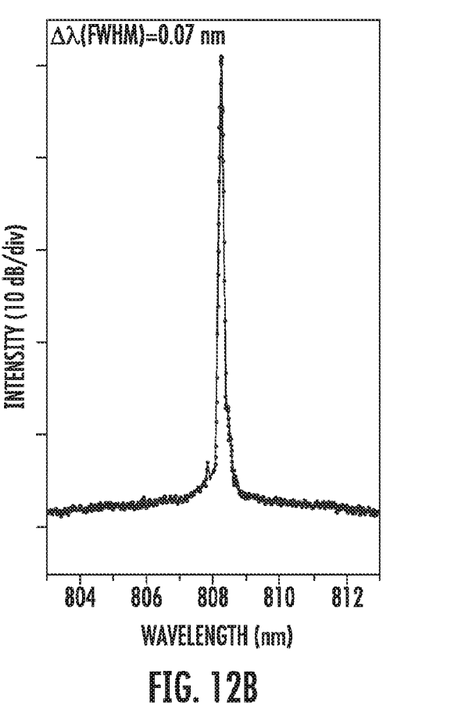
Figure 13A:
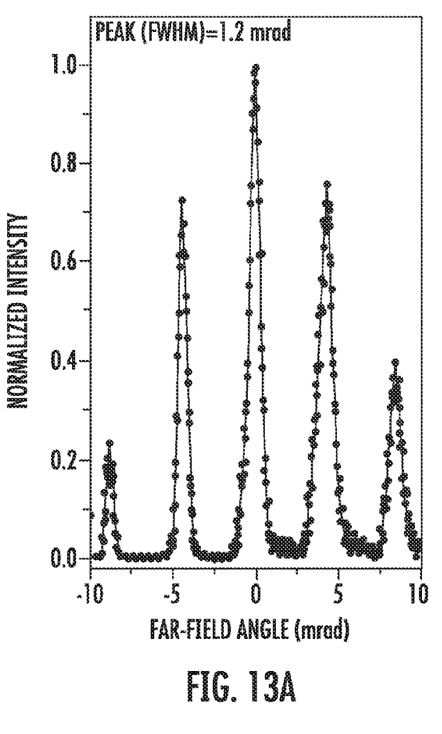
FIGS. 13(a) and (b) show experimental results in the form of (a) a far-field profile and (b) a spectrum of a phase-locked laser array at 32 A with a V-shape external Talbot cavity.
Figure 13B:
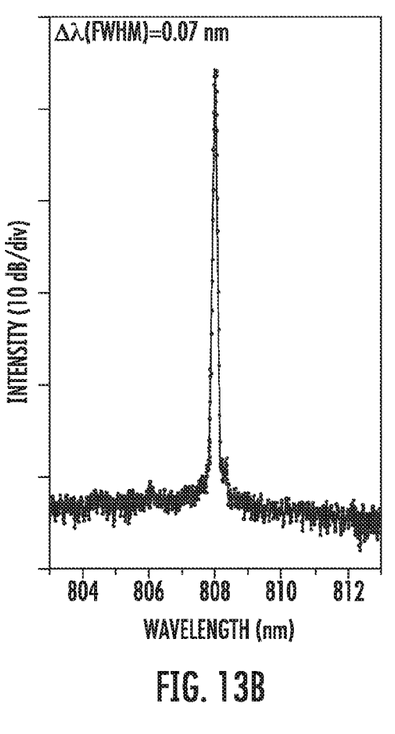

FIG. 12A shows that, at a high drive current (>50 A), the broad-area laser diode mode excited by the residual reflection from the AR-coated front-facet competes with the mode enhanced by the external cavity. As a result, the visibility of the far-field pattern slightly decreases when the injection current increases. The visibility was 80% at high injection current (60A) are shown in the FIG. 12A. The spectral line width value is 0.07 nm is shown in FIG. 12B, which is the detection limit of the detection device. As shown in FIG. 13, at a lower injection current (32A), it was also possible to achieve a spectral line width value of 0.07 nm in FIG. 13B, while the visibility was increased to >97% in FIG. 13A.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A system for coherent addition of broad-area laser diode emissions, comprising:
    an array of broad-area laser diodes, wherein each broad-area laser diode emits radiation and adjacent broad-area laser diodes are separated by a distance ($d_{pitch}$); and
    a V-shaped cavity, wherein a laser beam emitted from said system is coherent at a wavelength ($\lambda$) and wherein said V-shaped cavity comprises:
        a V-shaped reflector arranged to split radiation emitted from each of said broad-area laser diodes into a first beam traveling along a first optical path and a second beam traveling along a second optical path, wherein said V-shaped reflector is selected from the group consisting of a V-shaped prism reflector, a V-shaped stepped reflector and an array of micro-prism reflectors,
        a fast-axis correction lens disposed between said array of broad-area laser diodes and said V-shaped reflector,
        a cylindrical lens, having a focal distance (f), and a grating arranged sequentially along said first optical path, wherein said grating is arranged to direct first-order diffraction at said wavelength ($\lambda$) toward said array of broad-area laser diodes, and
        a second cylindrical lens, having a second focal distance ($f_2$), and a second grating arranged sequentially along said second optical path, wherein said second grating is arranged to direct first-order diffraction at said wavelength ($\lambda$) toward said array of broad-area laser diodes, wherein a distance along said second optical path between said second cylindrical lens and said second grating is equal to said second focal distance ($f_2$).

2. The system according to claim 1, wherein a distance along said first optical path between said cylindrical lens and said grating is substantially equal to a sum of said focal distance (f) and a half-Talbot distance ($Z_t/2$), wherein $Z_t=2d_{pitch}^2/\lambda$.

3. The system according to claim 1, wherein said broad-area laser diodes operate in multiple-transverse modes.

4. The system according to claim 1, further comprising a stepped, phase compensation plate arranged along said first optical path positioned between said V-shaped reflector and said cylindrical lens.

5. The system according to claim 1, further comprising:
    an optical coupler arranged along said first optical path or said second optical path, wherein said optical coupler reflects a first portion of said first beam, said second beam or both, and transmits out of said system a laser beam comprising a second portion of said first beam, said second beam or both.

6. The system according to claim 1, wherein said V-shaped reflector comprises an array of micro-prism reflectors.

7. The system according to claim 6, wherein at least one of said micro-prism reflectors is independently adjustable.

8. The system according to claim 1, further comprising an external injection laser arranged to emit a locking laser beam along a second optical path into said array of broad-area laser diodes.

9. The system according to claim 1, wherein said array of broad-area laser diodes is one of a one-dimensional linear array or a two-dimensional stacked array.

10. A system for coherent addition of broad-area laser diode emissions, comprising:
an array of broad-area laser diodes, wherein each broad-area laser diode emits radiation and adjacent broad-area laser diodes are separated by a distance ($d_{pitch}$); and
a V-shaped cavity, wherein a laser beam emitted from said system is coherent at a wavelength ($\lambda$) and wherein said V-shaped cavity comprises:
a V-shaped reflector arranged to split radiation emitted from each of said broad-area laser diodes into a first beam traveling along a first optical path and a second beam traveling along a second optical path, wherein said V-shaped reflector is selected from the group consisting of a V-shaped prism reflector, a V-shaped stepped reflector and an array of micro-prism reflectors,
a fast-axis correction lens disposed between said array of broad-area laser diodes and said V-shaped reflector, and
a cylindrical lens, having a focal distance (f), and a grating arranged sequentially along said first optical path, wherein said grating is arranged to direct first-order diffraction at said wavelength ($\lambda$) toward said array of broad-area laser diodes,
wherein said V-shaped cavity is a ring cavity and said first and second optical paths overlap in whole or in part.

11. A system for combining laser diode emissions, comprising:
an array of broad-area laser diodes, wherein each broad-area laser diode emits radiation and adjacent broad-area laser diodes are separated by a distance ($d_{pitch}$); and
a V-shaped cavity, wherein a laser beam emitted from said system is coherent at a wavelength ($\lambda$), said V-shaped cavity comprising:
a V-shaped reflector arranged to split radiation emitted from each of said broad-area laser diodes into a first beam traveling along a first optical path and a second beam traveling along a second optical path, wherein said V-shaped cavity is a ring cavity and said first and second optical paths overlap in whole or in part, and
a fast-axis correction lens disposed between said array of broad-area laser diodes and said V-shaped reflector.

12. The system according to claim 11, further comprising:
a cylindrical lens, having a focal distance (f), and
a grating arranged sequentially along said first optical path, wherein said grating is arranged to direct first-order diffraction at said wavelength ($\lambda$) toward said array of broad-area laser diodes, wherein a distance along said first optical path between said cylindrical lens and said grating is a sum of said focal distance (f) and a half-Talbot distance ($Z_t/2$), wherein $Z_t = 2d_{pitch}^2\lambda$.

13. The system according to claim 11, further comprising:
an optical coupler arranged along said first optical path or said second optical path, wherein said optical coupler reflects a first portion of said first beam, said second beam or both, and transmits out of said system a laser beam comprising a second portion of said first beam, said second beam or both.

14. A system for coherent addition of laser diode emissions, comprising:
an array of broad-area laser diodes, wherein each laser diode emits radiation and adjacent broad-area laser diodes are separated by a distance ($d_{pitch}$); and
a V-shaped cavity, wherein a laser beam emitted from said system is coherent at a wavelength ($\lambda$) and wherein said V-shaped cavity comprises:
a V-shaped reflector arranged to split radiation emitted from each of said broad-area laser diodes into a first beam traveling along a first optical path and a second beam traveling along a second optical path, wherein said V-shaped reflector is selected from the group consisting of a V-shaped prism reflector, a V-shaped stepped reflector and an array of micro-prism reflectors,
a fast-axis correction lens disposed between said array of broad-area laser diodes and said V-shaped reflector,
an external injection laser arranged to emit a locking laser beam along a second optical path into said array of broad-area laser diodes,
at least one optical isolator positioned along said second optical path between said external injection laser and said V-shaped reflector, wherein said at least one optical isolator prevents electromagnetic radiation emitted by said array of broad-area laser diodes from propagating to said external injection laser,
a cylindrical lens, having a focal distance (f), and
a grating arranged sequentially along said first optical path, wherein said grating is arranged to direct first-order diffraction at said wavelength ($\lambda$) toward said array of broad-area laser diodes,
wherein said V-shaped cavity is a ring cavity and said first and second optical paths overlap in whole or in part.

15. The system according to claim 14, wherein a distance along said first optical path between said cylindrical lens and said grating is substantially equal to a sum of said focal distance (f) and a half-Talbot distance ($Z_t/2$), wherein $Z_t = 2d_{pitch}^2/\lambda$.

16. The system according to claim 1, wherein said V-shaped reflector comprises a stepped reflector.

* * * * *